US007921123B2

(12) United States Patent
Satlow (10) Patent No.: US 7,921,123 B2
(45) Date of Patent: Apr. 5, 2011

(54) METHOD AND SYSTEM FOR PROCESSING PHYSICIAN CLAIMS OVER A NETWORK

(75) Inventor: Marcia Satlow, Watertown, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1867 days.

(21) Appl. No.: 10/078,780

(22) Filed: Feb. 19, 2002

(65) Prior Publication Data

US 2002/0147867 A1 Oct. 10, 2002

Related U.S. Application Data

(60) Provisional application No. 60/269,957, filed on Feb. 20, 2001.

(51) Int. Cl.
 *G06F 17/30* (2006.01)
(52) U.S. Cl. ............ 707/754; 707/705; 707/770; 705/2; 705/3; 705/4
(58) Field of Classification Search .......... 705/1–4, 705/35, 50–55; 707/1–7, 10, 100–104.1, 707/200; 128/920, 923; 600/300–301; 706/4, 706/5, 10, 924, 925; 709/203–215
See application file for complete search history.

(56) References Cited

U.S. PATENT DOCUMENTS

| | | | | |
|---|---|---|---|---|
| 5,557,514 A |   | 9/1996 | Seare et al. | 364/401 |
| 5,619,991 A | * | 4/1997 | Sloane | 600/300 |
| 5,772,585 A | * | 6/1998 | Lavin et al. | 600/300 |
| 5,819,228 A | * | 10/1998 | Spiro | 705/2 |
| 5,835,897 A |   | 11/1998 | Dang | 705/2 |
| 5,845,254 A |   | 12/1998 | Lockwood et al. | 705/2 |
| 5,890,129 A | * | 3/1999 | Spurgeon | 705/4 |
| 5,933,809 A | * | 8/1999 | Hunt et al. | 705/3 |
| 5,956,690 A | * | 9/1999 | Haggerson et al. | 705/3 |
| 5,974,389 A | * | 10/1999 | Clark et al. | 705/3 |

(Continued)

FOREIGN PATENT DOCUMENTS

CA 2415013 * 12/2002 .................. 17/40

(Continued)

OTHER PUBLICATIONS

Saha,S, "The new age electronic patient record system", Biomedical engineering conference, Apr. 1995, pp. 134-137.*

(Continued)

*Primary Examiner* — Khanh B Pham
(74) *Attorney, Agent, or Firm* — Howard IP Law Group, PC (57) ABSTRACT

A method and system for gathering, collating and sorting information items distributed among a plurality of databases containing information items regarding physician treatment/billing claims, insurance payments, and provider/patient relations over at least one communication networks is disclosed. The method comprises the steps of creating an intermediate data base containing information items related to physician treatment/billing claim data, insurance payment data, and insurance provider. The information items are further cross-referenced with regard to at least one common information item. The information items in the intermediate data base are then filtered using at least one selected information item contained in the intermediate data base to create at least one file containing cross-referenced data items relating to the filtering criteria, and reporting a selected one of the file. In another aspect of the invention, the created files may be selectively filtered using additional filter criteria.

21 Claims, 7 Drawing Sheets

U.S. PATENT DOCUMENTS

| | | | |
|---|---|---|---|
| 5,991,729 A * | 11/1999 | Barry et al. | 705/3 |
| 6,035,276 A * | 3/2000 | Newman et al. | 705/2 |
| 6,112,183 A * | 8/2000 | Swanson et al. | 705/2 |
| 6,283,761 B1 * | 9/2001 | Joao | 434/236 |
| 6,324,516 B1 * | 11/2001 | Shults et al. | 705/2 |
| 6,341,265 B1 * | 1/2002 | Provost et al. | 705/4 |
| 6,343,271 B1 * | 1/2002 | Peterson et al. | 705/4 |
| 6,438,533 B1 * | 8/2002 | Spackman et al. | 706/45 |
| 6,529,876 B1 * | 3/2003 | Dart et al. | 705/4 |
| 6,611,846 B1 * | 8/2003 | Stoodley | 707/104.1 |
| 6,655,583 B2 * | 12/2003 | Walsh et al. | 235/380 |
| 6,757,898 B1 * | 6/2004 | Ilsen et al. | 709/203 |
| 6,792,410 B1 * | 9/2004 | Donovan et al. | 705/4 |
| 6,826,536 B1 * | 11/2004 | Forman | 705/4 |
| 6,879,959 B1 * | 4/2005 | Chapman et al. | 705/2 |
| 6,886,016 B2 * | 4/2005 | Hansen et al. | 707/102 |
| 6,915,265 B1 * | 7/2005 | Johnson | 705/2 |
| 6,915,266 B1 * | 7/2005 | Saeed et al. | 705/2 |
| 6,957,218 B1 * | 10/2005 | Wyatt | 707/10 |
| 2001/0016872 A1 * | 8/2001 | Kusuda | 709/205 |
| 2002/0007284 A1 * | 1/2002 | Schurenberg et al. | 705/2 |
| 2002/0019754 A1 * | 2/2002 | Peterson et al. | 705/4 |
| 2002/0035529 A1 * | 3/2002 | Tooke, III | 705/35 |
| 2002/0077869 A1 * | 6/2002 | Doyle et al. | 705/4 |
| 2002/0111833 A1 * | 8/2002 | Dick | 705/3 |
| 2002/0148893 A1 * | 10/2002 | Walsh et al. | 235/380 |
| 2002/0188467 A1 * | 12/2002 | Eke | 705/2 |
| 2002/0198741 A1 * | 12/2002 | Randazzo | 705/3 |
| 2003/0046107 A1 * | 3/2003 | Eisenberg et al. | 705/2 |
| 2003/0083903 A1 * | 5/2003 | Myers | 705/2 |
| 2003/0120516 A1 * | 6/2003 | Perednia | 705/3 |
| 2004/0260577 A1 * | 12/2004 | Dahlin et al. | 705/2 |

FOREIGN PATENT DOCUMENTS

| | | | |
|---|---|---|---|
| WO | WO 91/15817 | * 10/1991 | |
| WO | WO 01/04821 A1 | * 1/2001 | 17/60 |

OTHER PUBLICATIONS

Foran,D.J et al. "a distributed health information network for consultative services in surgical pathology", IEEE 17th annual conference in Engineering in medicine and biology society, 1995, vol. 1, pp. 20-25.*

Practice 2000 for medical & dental practices, Abaki pty.ltd. 1994-2003 13 pages.*

* cited by examiner

METHOD AND SYSTEM FOR PROCESSING PHYSICIAN CLAIMS OVER A NETWORK

CROSS REFERENCE TO RELATED APPLICATION

This application relates to and claims the benefit of the earlier filing date under 35 U.S.C. 119, of U.S. Provisional Patent Application Ser. No. 60/269,957 entitled "Network Physician Claim Profiling Tool," filed on Feb. 20, 2001.

FIELD OF THE INVENTION

The present invention relates to processing insurance claims over a network and more specifically to processing physician claims to provide proper reimbursement.

BACKGROUND OF THE INVENTION

A majority of people today use medical insurance to pay for treatment at a plurality of medical providers, such as, doctors, HMOs and medical centers. Medical providers, in turn, then submit detailed invoices to one or more designated insurance companies that are obligated to pay for the services provided. Because of the volume of invoices received and the insurance companies' need to verify that the invoices contain treatments that the company is obligated to pay, there is significant delay in reconciling the patients account and paying the medical provider. Further, when a patient has multiple insurance coverage, e.g., MEDICAID, MEDICARE, private health insurance, there is a need to insure that each insurance provider fulfills their required obligation for payment and to prevent each insurance provider from returning a full payment to the medical provider or patient.

Hence, there is a need for a system that monitors and reconciles the patients' treatments and medical services provided to insure that proper and rapid reimbursement of medical services is returned to the medical provider or patient.

SUMMARY OF THE INVENTION

A method and system for gathering, collating and sorting information items distributed among a plurality of databases containing information items regarding physician treatment/billing claims, insurance payments, and provider/patient relations over at least one communication networks is disclosed. The method comprises the steps of creating an intermediate data base containing information items related to physician treatment/billing claim data, insurance payment data, and insurance provider. The information items are further cross-referenced with regard to at least one common information item. The information items in the intermediate data base are then filtered using at least one selected information item contained in the intermediate data base to create at least one file containing cross-referenced data items relating to the filtering criteria, and reporting a selected one of the file. In another aspect of the invention, the created files may be selectively filtered using additional filter criteria.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

Figure 1:
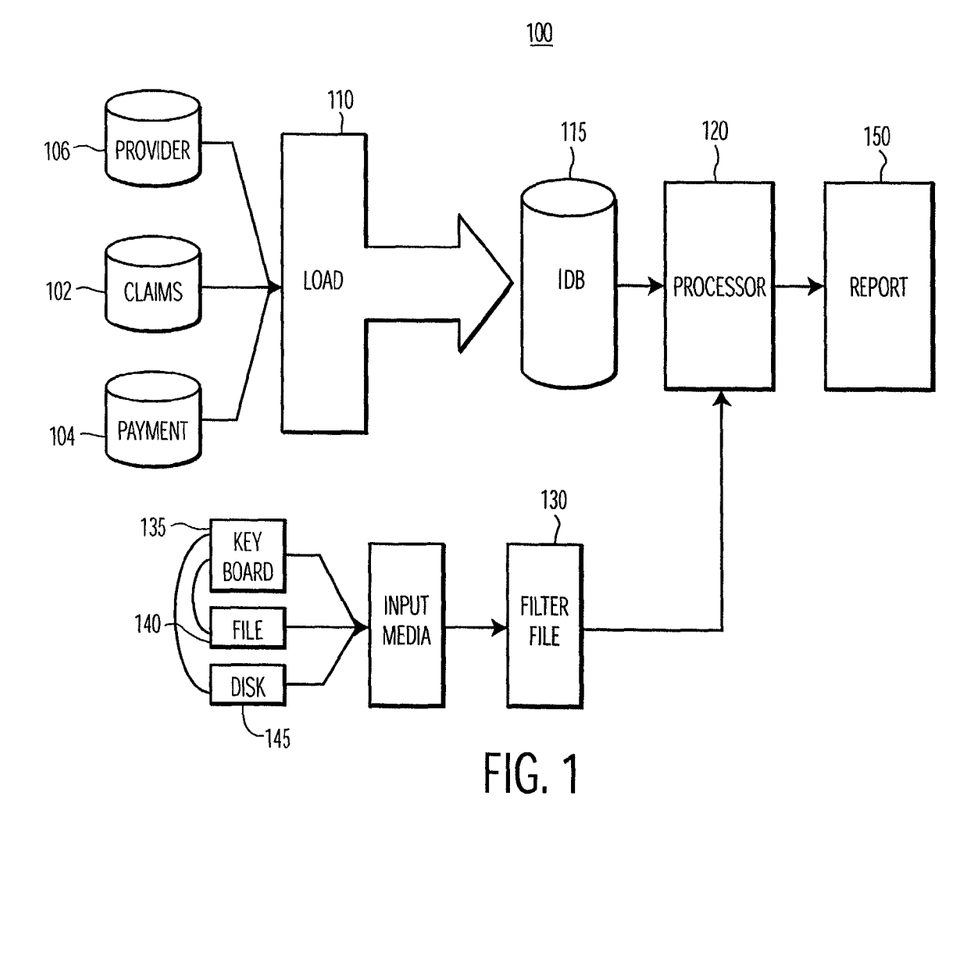
FIG. 1 illustrates a block diagram of an exemplary process flow in accordance with the principles of the invention.

FIG. 1 illustrates a block diagram of an exemplary process 100 in accordance with the principles of the present invention. In this process 100, information items contained on first database 102, representative of physician or medical provider claims, are provided or applied to load module 110. Similarly, information items contained on second data base 104 and third data base 106, representative of payment or invoice data and provider data, respectively, are provided or applied to load module 110. Load module 110, as will be more fully explained, operates on the provided or applied information items to produce intermediate database 115 (IDB). Intermediate database 115 contains information items that are cross-linked or cross-referenced to corresponding claim information items, payment information items and provider information items contained in data bases 102, 104, and 106 respectively. The cross-referenced information items are then applied to processor 120 for subsequent analysis and operations. Processor 120 also receives input values from filter file 130, which are used to determine the analysis and operations performed on the provided cross-referenced data or information items. Processor 120 then selects and retains those information items, and corresponding cross-referenced information items, that match the input values or operations designated by filter file 130. The output of processor 120 may then be reported as report 150 or displayed on a display (not shown), such as a computer CRT monitor, LCD or LED display.

Filter file 130 may include values or operations that are entered via an input media, which is illustrated as keyboard 135, a file 140, magnetic medium such as a disk 145, or a memory (not shown). As would be appreciated, keyboard 135 may also be used to enter input values into file 140 or disk 145.

Figure 2:
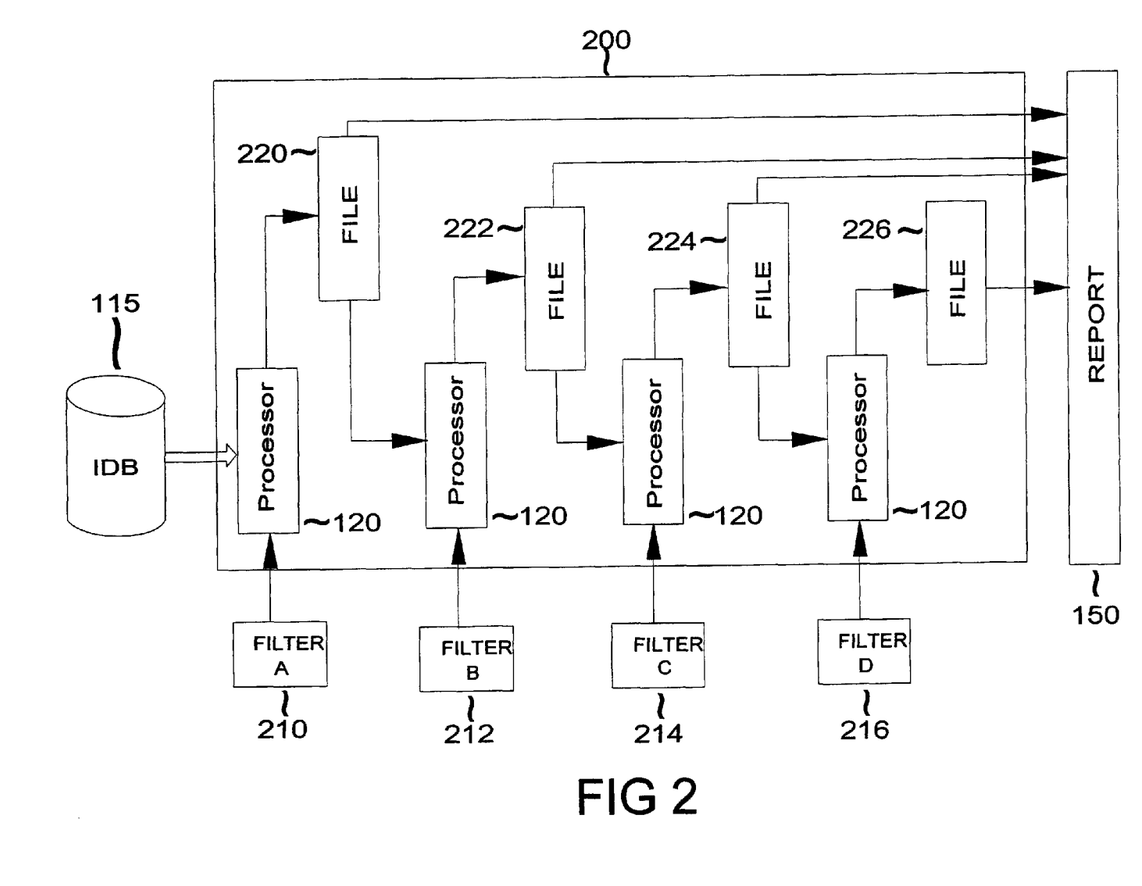
FIG. 2 illustrates a block diagram of an exemplary processing in accordance with the principles of the invention.

FIG. 2 depicts a block diagram of an exemplary process 200 of iteratively managing physician, claim, provider, etc., data or information items in accordance with the principles of the present invention. In this illustrative example, information items contained on IDB 115 and filter data items, represented as first filter 210, entitled Filter A are provided to processor 120. The information items of IDB 115 matching the criteria of Filter A 210 are then stored in a corresponding file 220. In a second level of filtering, data or information items in selected file 220 and filter data items in second filter 212, represented as Filter B are again applied to processor 120. In this case, information items matching the criteria of second filter 212 are stored in corresponding file 222. In a third level of filtering, information items contained in selected file 222 and filter data items in third filter 214, represented as Filter C, are again applied to processor 120. Those information items matching the criteria of filter 214 are stored in corresponding file 224. At a fourth level of filtering, the information items contained in selected file 224 and filter data items of fourth filter 216, represented as Filter D are applied to processor 120. Those information items matching the criteria contained in filter 216 are stored in file 226. Thus, in this illustrated process, file 226 contains those information items of IDB 115 that match the criteria of Filter A 210, Filter B 212, Filter C 214 and Filter D 216. Each of the files 220, 222, 224, 226 may then be selectively available for reporting as report 150 or viewing on a display (not shown). As an example of the operations performed by the illustrated process 200, file 220 may contain information regarding all claims for the year of 2000, file 222 may contain information regarding all claims relating to a particular medical ailment in the year 2000, file 224 may contain information regarding all claims relating to a particular ailment in a specified area or region in the year 2000 and file 226 may contain information regarding a specific treatment relating to a particular ailment in a specified region in the year 2000. As would be appreciated, a similar analysis may be performed in another year by selecting different matching criteria for Filter A 210. An analysis of a most-often-used treatment type, for example, may similarly be determined by selecting different matching criteria for Filter D 216. Furthermore, although four levels of subsequent filtering are illustrated, it would be appreciated that any number of levels of filtering may be achieved by the removal or addition of filter data and are contemplated to be within the a scope of the invention.

Figure 3:
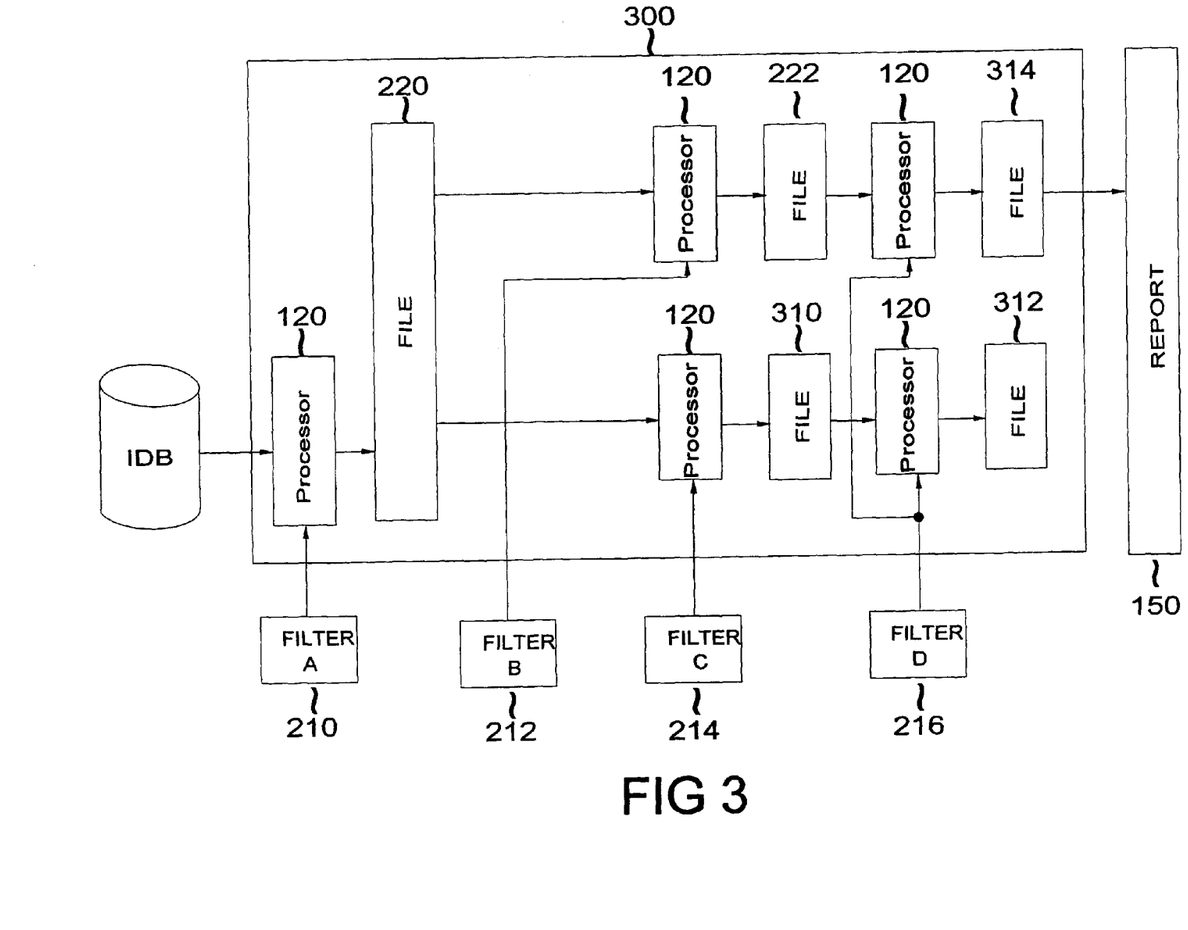
FIG. 3 illustrates a block diagram of a second exemplary processing in accordance with the principles of the invention.

FIG. 3 illustrates a block diagram of a second exemplary process 300 for iteratively managing physician, claim, insurance, provider, etc., data in accordance with the principles of the invention. In this exemplary process, information items stored on IBD 115 and filter items within first filter 210, represented as Filter A, are applied to processor 120. Those information items matching the criteria of Filter A 210 are stored in file 220. In a second level of filtering, information items stored in selected file 220 and filter criteria items within second filter 212, represented as Filter B, are applied to processor 120. Those information items matching the criteria of Filter B 212 are stored in file 222. Sequentially or concurrently, information items stored in selected file 220 and filter criteria items within third filter 212, represented as Filter C, are applied to processor 120. Those information items matching the criteria of Filter C 214 are stored in file 310. As a third level, information items stored in selected file 222 are filtered using fourth filter 216, represented as Filter D. Those information items in selected file 222 matching the criteria of Filter D 216 are stored in file 314. Sequentially or concurrently, information items stored in selected file 310 are filtered using fourth filter 216. Those information items in selected file 310 matching the criteria of Filter D 216 are, in this case, stored in file 312. File 312, thus, contains information items representative of information items within IDB 115 matching criteria selected by Filters A, C and D, while file 314 includes information items representative of information items within IDB 115 matching criteria selected by Filters, A, B and D. Each of the files 220, 222, 310, 314 and/or 314 may be selected for viewing at report 150.

Figure 4:
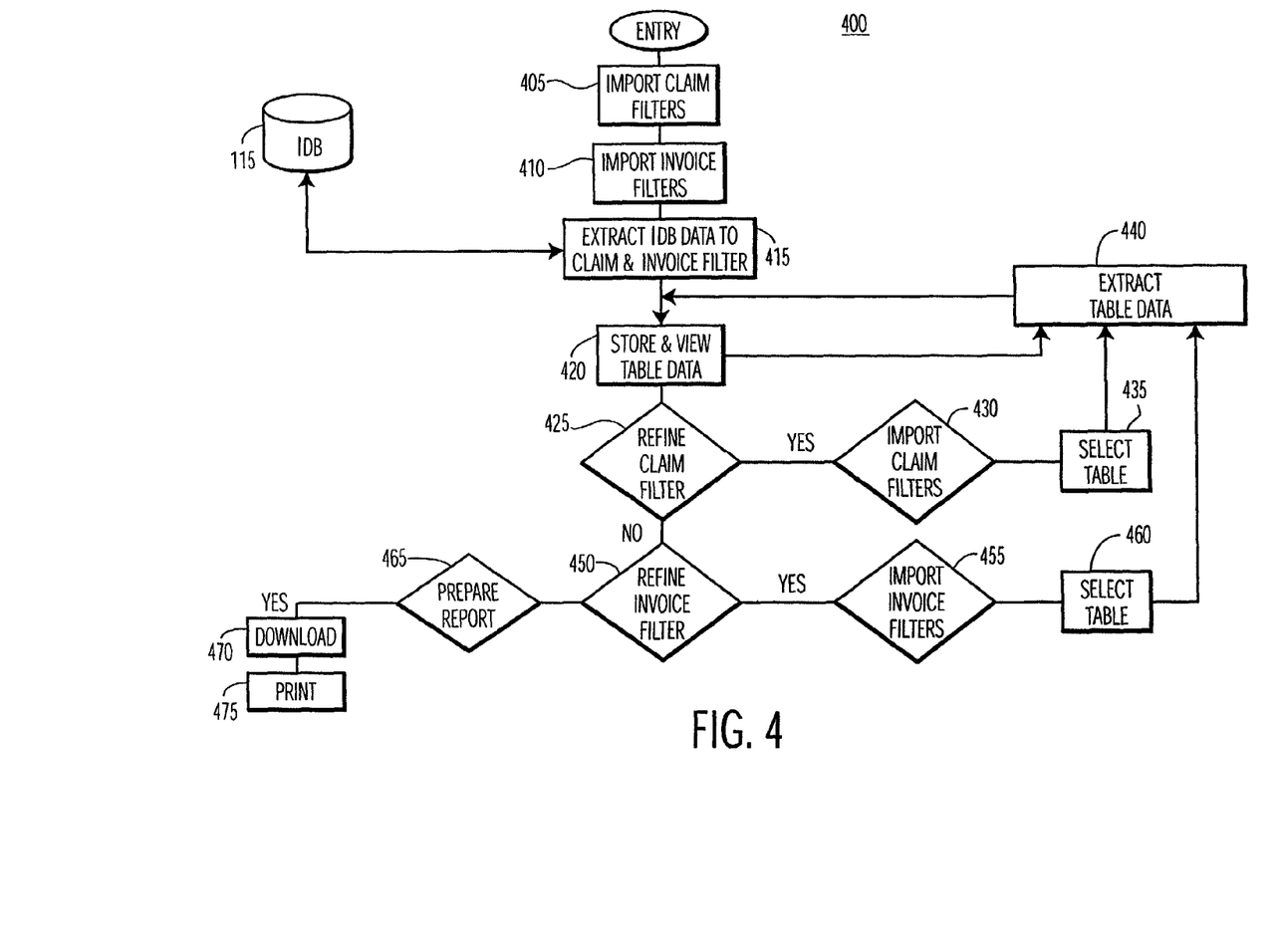
FIG. 4 illustrates a flow chart of an exemplary processing shown in FIG. 1.

FIG. 4 illustrates a flow chart of an exemplary process 400 wherein information items within IDB 115 are extracted and filtered using filtering criteria related to both claim number and invoice number. Although FIG. 4 illustrates the use of two-dimensional filtering it would be appreciated that any parameter or information item or any number of parameters or information items or any range associated with any parameters contained in IDB 115 may be used as filtering criterion.

In this illustrative example, a claim number is input to or imported into process 400 at block 405 (import claim number). Similarly, at block 410 (import invoice number), an invoice number is input to or imported into process 400. At block 415 (extract IDB data to claim and invoice filter) IDB 115 is then accessed to identify and extract information items that match the inputted or imported claim number and invoice number filter criteria. Information items that are cross-referenced to the matched information items are also identified and extracted. The extracted information items or data are stored in a table or file. In a preferred embodiment, the extracted information items are stored in a table or file that is suitable for further filter processing at block 420. In a most preferred embodiment of the invention, the extracted information items and the associated cross-referenced extracted information items are in a format similar to that of an initial file stored in IDB 115. In this manner, process 400 may access and filter selected tables or files without any changes or modifications.

At block 425 (refine claim) a determination is made whether the claim number filter information requires refinement to extract more specific information items. If the answer is in the affirmative, then at block 430, at least one additional claim filter criterion information item is inputted or imported. At block 435 (select table) a file or table is selected from which information items matching the additional claim filter criterion are extracted. At block 440 (extract table data), information items matching, in this example, initial and additional claim filter criteria and initial invoice filter criteria are extracted from the selected table or file. As would be appreciated, IDB 115 may also be selected. This process of refinement of the claim number information may be iteratively continued until no information items matching the refined filtering criteria are extracted.

Returning to the determination at block 425, if the answer is in the negative then at block 450 (refined invoice) a determination is made whether the inputted invoice filter criteria requires refinement. If the answer is in the affirmative, then at block 455 (import invoice filters), additional invoice filter criteria information are inputted or imported. At block 460 (select table), a file or table is selected from which information items matching the additional invoice filter criteria are extracted. At block 440 (extract table data), information items matching, in this example, initial claim filter criteria and initial and additional invoice filter criteria are extracted from a selected table or file. This process of refinement of the invoice number information may be iteratively continued until no information items matching the refined filtering criteria are extracted.

If the answer at block 450 is in the negative, then at block 465 (prepare report) a determination is made whether a report is to be prepared. If the answer is in the affirmative, then in one aspect of the invention, at block 470 (download) the report prepared may be downloaded, over a network, for example, and/or may be printed at block 475 (print). In another aspect of the invention, the report may be displayed on a computer monitor, for example.

Figure 5:
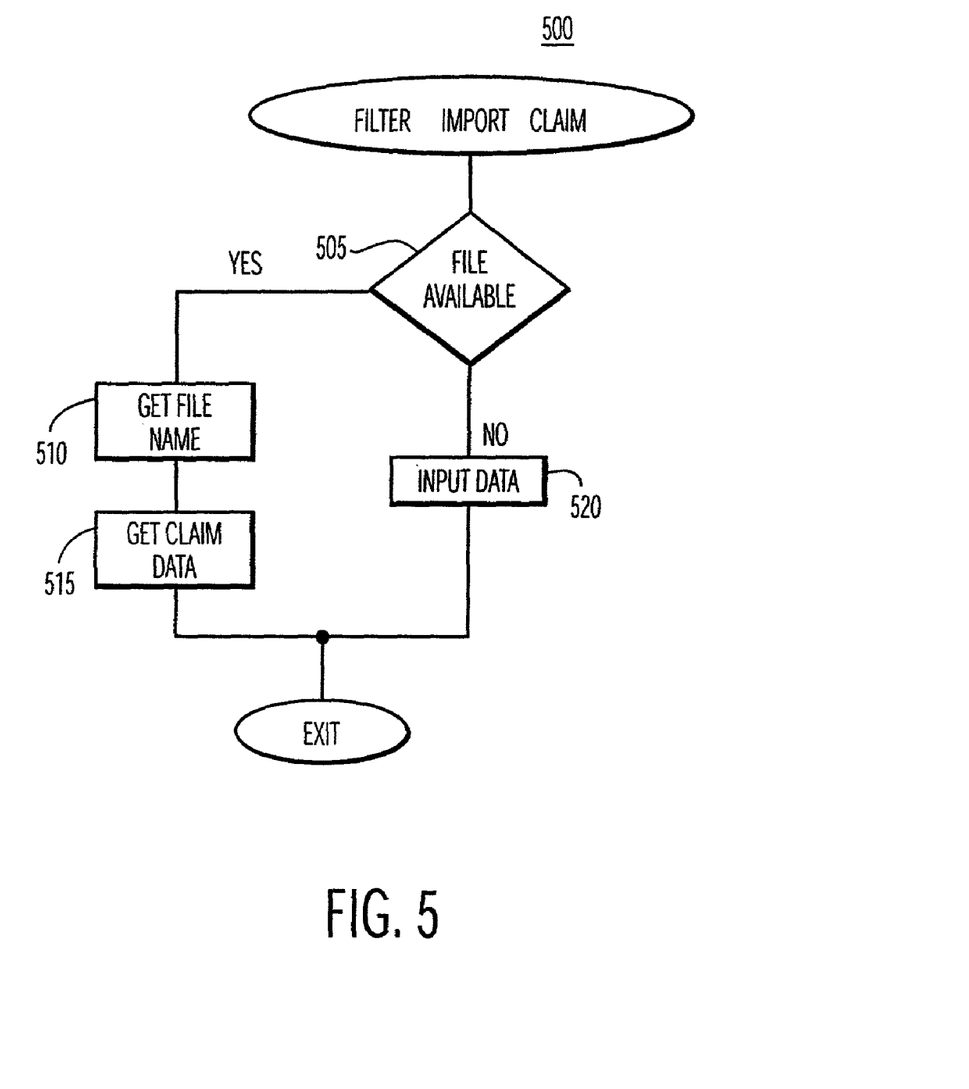
FIG. 5 illustrates a flow chart of an exemplary process for determining filter settings in accordance with the principles of the invention.

FIG. 5 illustrates a flow chart of an exemplary process 500 for inputting or importing filter criteria information. Although process 500 illustrates processing for inputting or importing information regarding extracting claim information from IDB 115 or a selected file or table, it would be appreciated that similar processing may be used for inputting or importing information regarding filtering or extracting information items associated with any other parameter, parameters or parameter range contained within IDB 115 or subsequent tables or files.

In this exemplary process illustrated, a determination is made at block 505 (file available) whether filter criteria information regarding a claim filter having desired filtering characteristics is available. In one aspect of the invention, filtering criteria or information items used for filtering of "often-used-values" may be stored in one or more databases or files. This prestored filter information may be stored locally or may be accessed over a network. Prestoring information items is well known in the art and need not be discussed in detail herein.

If the answer, at block 505, is in the affirmative, then at block 510, (get name of file) the name of the file or database containing the desired filter information or criteria is input, imported or obtained. A file name may be manually entered or obtained by selecting a name from a list of files. At block 515 (get claim data) filter criteria data associated with the filter file name is obtained.

If, however, the determination at block 505 is in the negative, then data corresponding to filter criteria may be input at block 520 (input data). In one aspect, filter criteria data may be manually input from an input device such as a keyboard. The input data may also be stored in the filter file located on a database, magnetic or optical disk drive, permanent or semi-permanent memory, etc.

Figure 6:
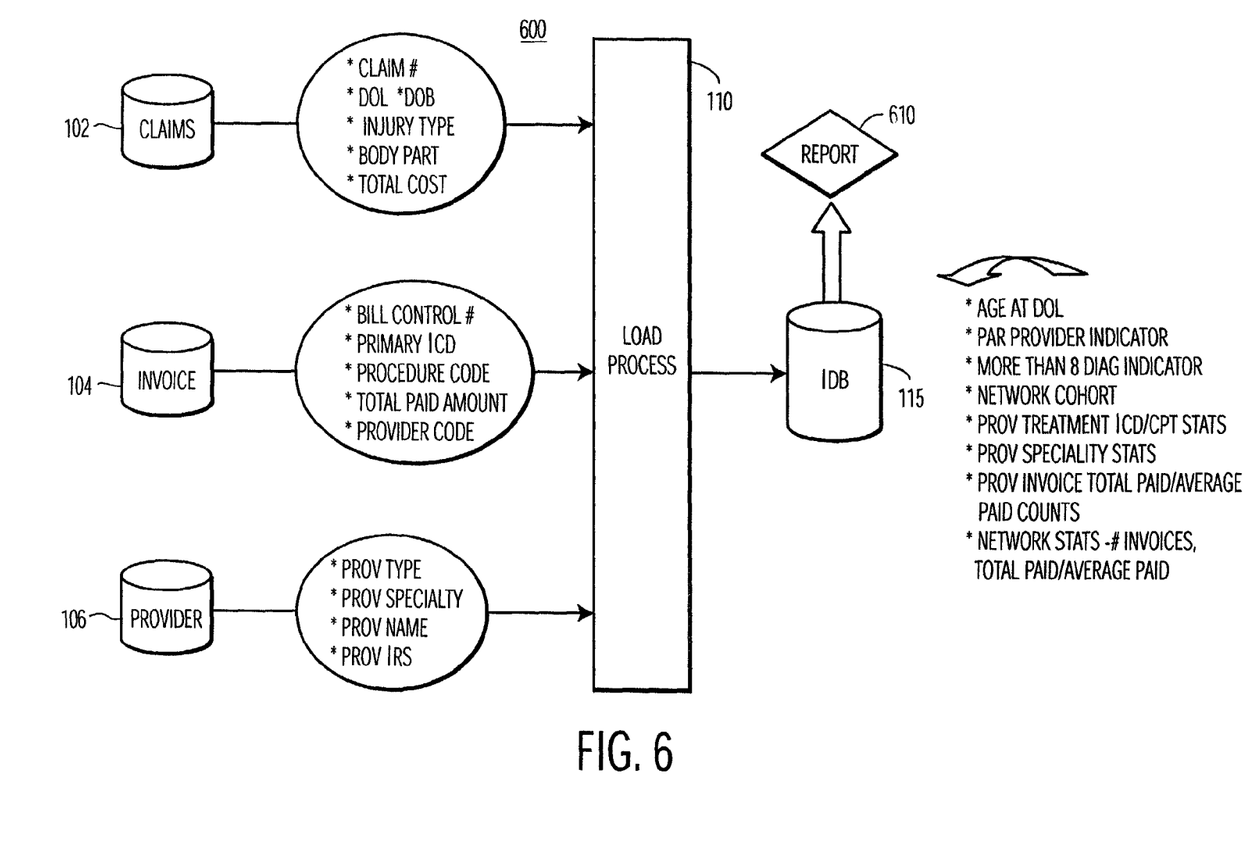
FIG. 6 illustrates a block diagram of an exemplary process for creating an intermediate data base in accordance with the principles of the present invention.

FIG. 6 illustrates a block diagram of exemplary process 600 for creating an IDB 115 from at least one database containing information items related to physician claims, invoices/payments and provider/patient relations. In this illustrative example, information items from claims database 102, such as claim number, Date of Loss, Date of Birth, Injury Type, body part, total cost, etc., are input or applied to load process 110. Serially or concurrently, in time, information items, such as bill control number, primary ICD, procedure code, etc., from invoice database 104 are input to or applied to load process 110. Serially or concurrently, in time, information items, such as provider type, provider specialty, etc., from provider database 106 are input or applied to load process 110. Load process 110 then organizes the provided information items, such that information items are cross-referenced to corresponding information items among the illustrated data providing databases 102, 104, and 106 using at least one common information item. For example, claim database 102 may contain a physician's claim for services performed on a patient. The claim may include identification information items, such as social security number, medical group number, insurance provider, etc., in addition to the patient's name, a diagnosis, diagnosis classification code, treatment, treatment code, amount for services rendered etc. The provider database 106 may include information items such as patients' names, social security numbers, names of treating physicians and payment values. The provider database 106 may also include information items regarding the payment and treatment schedule that have been provided by the provider for each patient. Hence, load process 110 may cross-link or reference a claim regarding a specific patient with a provider based on at least the provider identification code. The provider information may further be cross-linked to a treatment schedule based on at least the patients identification code.

In creating IDB 115, load process 110, in one aspect of the invention, may validate each of the information items contained in each of the databases providing information items. In this aspect, selected information items may be compared to predetermined or known ranges. When an information item is detected outside a corresponding known range, then a known default value may be entered into the corresponding field in IDB 115. The known default value may be automatically entered, or a prompt may be made for a user to enter at least one known information value. For example, diagnosis codes, which are based on the well known code system, and contained within claims data base 102 may be validated against a range of diagnosis codes. In this aspect of the invention, when a diagnosis code is determined not to be within a valid range, then a known default value may be dynamically entered in the field corresponding diagnosis code.

Load process 110 may further create at least one composite information item that is not contained in any of the databases providing information items. For example, load process 110 may compare the treating physician's name or identification number in an entry within claims database 102 with lists of physician's names or identification numbers located in a provider's database 106 to determine whether a physician submitting a claim or claims is within a network of physicians that participate in the provider's plan. If the determination is in the affirmative, then an indication that signifies the status of the physician within the provider's plan may be placed in a new field in IBD 115. Otherwise, a second indication may be placed in the new field in IBD 115 to indicate the physician is not within the provider's plan.

Figure 7:
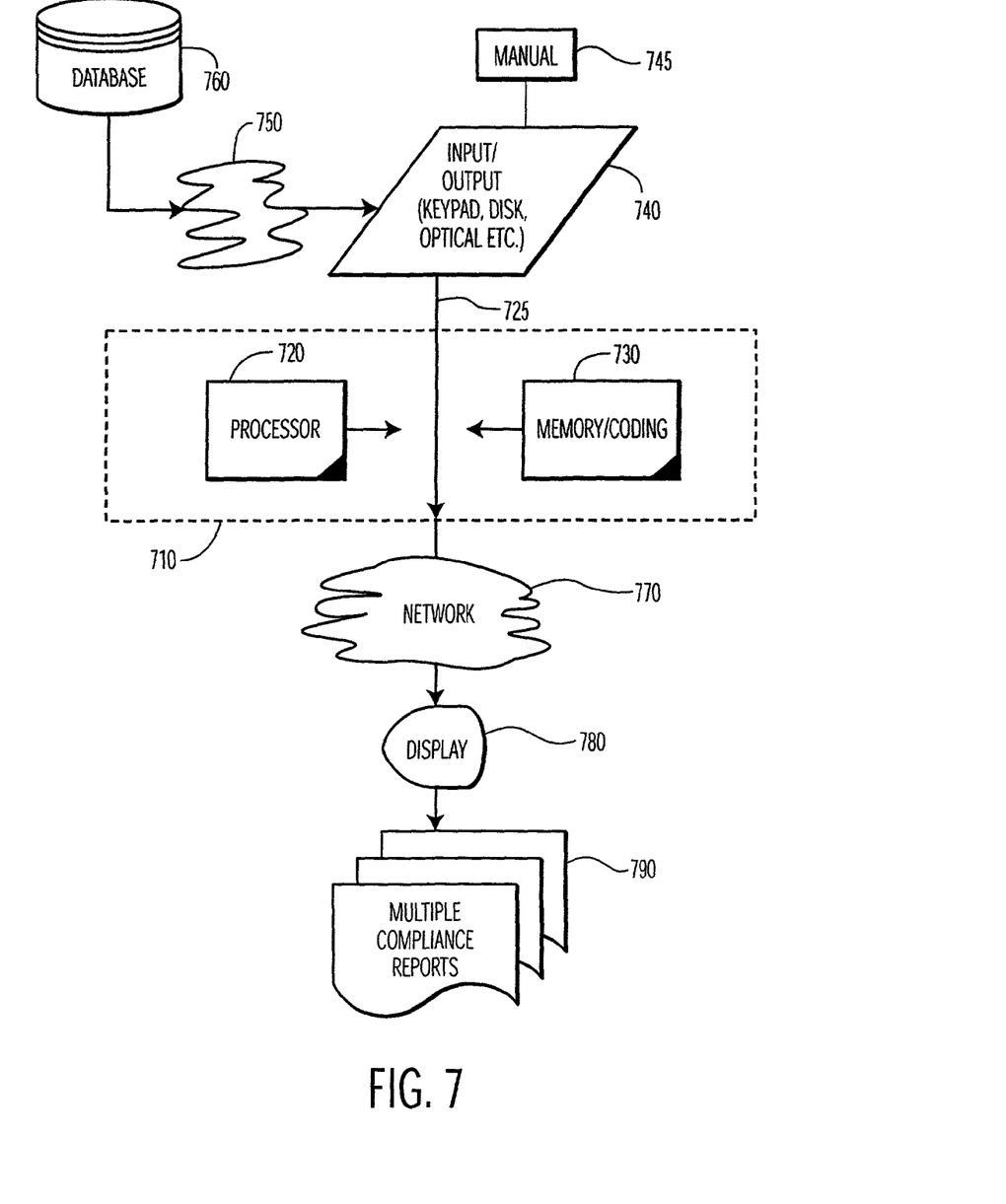
FIG. 7 illustrates a system operable to execute the exemplary processing illustrated in FIG. 4.

FIG. 7 illustrates an exemplary system 700 for practicing the principles of the invention. In this exemplary system embodiment, input data is received over network 750 and is processed in accordance with one or more software programs executed by processing system 710. The results of processing system 710 may then be transmitted over network 770 for viewing on display 780 and/or reporting at 790.

System 700 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 750 and 770 may be an internal network, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

One or more input/output devices 740 receive data from the illustrated database 760 over network 750 and the received data is applied to processing system 710. Processing system 710 comprises processor 720, which is in communication with input/output device 740 and memory 730. Input/output devices 740, processor 720 and memory 730 may communicate over a communication medium 725. The communication medium 725 may represent, for example, an ISA, a PCI, a PCMCIA bus, a communication network, one or more internal connections of a circuit, circuit card or other device, as well as portions and combinations of these and other communication media. Processor 720 may be representative of a handheld calculator, special purpose or general purpose processing system, desktop computer, laptop computer, palm computer, or personal digital assistant (PDA) device etc., as well as portions or combinations of these and other devices that can perform the operations illustrated in FIG. 4. Processor 720 may include code, which when executed, performs the operations illustrated in FIG. 4. The code may be contained in memory 730 or read/downloaded from a memory medium such as a CD-ROM or floppy disk (not shown), which is accessible by processor 720, when needed. The operations illustrated in FIG. 4 may be performed sequentially or in parallel using different processors to determine specific values. Further, the data received by input/output device 740 may be immediately accessible by processor 720 or may be stored in memory 730. As will be appreciated, input/output device 740 may also allow for manual input, such as a keyboard or keypad entry or may read data from magnetic or optical medium.

In other embodiments, hardware circuitry may be used in place of, or in combination with, software instructions to implement the invention. For example, the elements illustrated herein may also be implemented as discrete hardware elements or may be integrated into a single unit.

While there has been shown, described, and pointed out, fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated.

I claim:

1. A method for gathering, collating and sorting information items distributed among a plurality of databases containing information items regarding physician treatment/billing claims, insurance payments, and provider/patient relations over at least one communication network, said method comprising the steps of:
   (a) creating an intermediate data base of said physician treatment/billing claim data, insurance payment data, and insurance provider data, wherein information items among said databases are cross-referenced with regard to at least one common information item;
   (b) filtering said intermediate data base using at least one selected information item contained in said intermediate data base to create at least one file containing cross-referenced data items relating to said at least one selected information item;
   (c) reporting the cross-referenced data items;
   (d) filtering the cross-referenced data items in said at least one created file to create at least one file containing additional cross-referenced data item relating to at least one additional information item;
   (e) reporting the additional cross-referenced data items; and
   (f) repeating steps (d) and (e) until all gathering, collating and sorting information items is complete.

2. The method as recited in claim 1 wherein the step of filtering comprises the steps of: selecting at least one information item contained in said intermediate data base; identifying information items matching said at least one selected information item; and storing said matching information items and associated cross-referenced information items in a select one of said at least one file.

3. The method as recited in claim 2 wherein the step of filtering further comprises the step of: storing said selected at least one information item in a corresponding filter file.

4. The method as recited in claim 1 wherein the step of repeating comprises the steps of: selecting at least one information item contained in a selected one of said files; identifying information items matching said at least one selected information item; and storing said matching information items and associated cross-referenced information items in at least one file.

5. The method as recited in claim 4 wherein the step of repeating further comprises the step of: storing said selected at least one information item in a corresponding filter file.

6. The method as recited in claim 1 wherein at least one of said plurality of data bases includes information items selected from the group consisting of: patient name, patient identification number, treatment code, treatment, invoice number, amount billed, physician name, physician identification code, patient residence, and physician business address.

7. The method as recited in claim 1 wherein at least one of said plurality of databases includes information items selected from the group consisting of: patient name, patient identification code, physician name, physician identification code, treatment code, treatment, invoice number, and payment amount.

8. The method as recited in claim 1 wherein at least one of said plurality of databases includes information items selected from the group consisting of: provider name, provider identification number code, patient name, and patient identification code.

9. The method as recited in claim 1 wherein the step of accessing at least one of said data bases includes communicating over at least one network selected from the group comprising: ISA, PCI, PCMCIA, POTS, PBX, LAN, MAN, WAN, INTERNET, INTRANET.

10. The method as recited in claim 1 wherein the step of creating an intermediate database further comprises the steps of: validating information item values; and importing default information item values when a corresponding one of said information item values is outside a known range corresponding to said information item.

11. The method as recited in claim 10 wherein the step of importing comprises: manually entering said default information.

12. The method as recited in claim 10 wherein the step of importing comprises: automatically entering said default information.

13. The method as recited in claim 1 wherein the step of creating said intermediate database further comprises the step of: creating at least one new information item based on information items associated with information items among at least one of said plurality of databases.

14. The method as recited in claim 1 wherein said plurality of databases provide information items dynamically.

15. The method as recited in claim 1 wherein said at least one file is in a format all substantially similar to that of said intermediate database.

16. A system for gathering, collating and sorting information items distributed among a plurality of databases containing information items regarding physician treatment/billing claims, insurance payments, and provider/patient relations over at least one communication networks comprising:
   (a) an input/output means operable to receive said information items over said communication network;
   (b) a processor means in communication with said input/output device, said processor means operable to execute code for creating an intermediate data base of said physician treatment/billing claim data, insurance payment data, and insurance provider, wherein information items among said databases are cross-referenced with regard to at least one common information item;
   (c) a first means to filter said intermediate data base using at least one selected information item contained in said intermediate data base to create a first file containing cross-referenced data items relating to said at least one selected information item; and (d) one or more secondary means to filter one or more selected files using additional information items contained in said selected files to create one or more additional files containing cross-referenced data.

17. The system as recited in claim 16 wherein at least one of said plurality of data bases includes information items selected from the group consisting of: patient name, patient identification number, treatment code, treatment, invoice number, amount billed, physician name, physician identification code, patient residence, and physician business address.

18. The system as recited in claim 16 wherein at least one of said plurality of databases includes information items selected from the group consisting of: patient name, patient identification code, physician name, physician identification code, treatment code, treatment, invoice number and payment amount.

19. The system as recited in claim 16 wherein at least one of said plurality of databases includes information items selected from the group consisting of: provider name, provider identification number code, patient name, and patient identification code.

20. The system as recited in claim 16 wherein said at least one network selected from the group comprising: ISA, PCI, PCMCIA, POTS, PBX, LAN, MAN, WAN, INTERNET, INTRANET.

21. The system as recited in claim 16 wherein said plurality of databases provide information items dynamically.

* * * * *